United States Patent [19]

Ho et al.

[11] Patent Number: 5,723,930
[45] Date of Patent: Mar. 3, 1998

[54] STATORS INCORPORATING BLANK WINDING SLOTS FOR A PERMANENT MAGNET BRUSHLESS MOTOR AND METHOD OF WINDING THEREOF

[75] Inventors: Shih-Chiang Ho, Tainan; Ming-Chung Chang, Yunlin Hsien, both of Taiwan

[73] Assignee: Industrial Technology Research Institute, Hsinchu, Taiwan

[21] Appl. No.: 369,158

[22] Filed: Jan. 5, 1995

[51] Int. Cl.$^6$ .................................................. H02K 3/00
[52] U.S. Cl. ........................ 310/179; 310/180; 310/184; 310/202
[58] Field of Search ........................ 310/179, 180, 310/184, 202, 206; 242/432, 432.9; 29/596

[56] References Cited

U.S. PATENT DOCUMENTS

| | | | |
|---|---|---|---|
| 3,794,870 | 2/1974 | Broadway et al. | 310/180 |
| 4,492,890 | 1/1985 | MacDonald | 310/184 |
| 4,619,040 | 10/1986 | Wang et al. | 29/596 |
| 4,672,251 | 6/1987 | Broadway | 310/198 |
| 4,918,347 | 4/1990 | Takaba | 310/179 |
| 5,336,956 | 8/1994 | Haner | 310/179 |

*Primary Examiner*—Steven L. Stephan
*Assistant Examiner*—Timothy A. S. Williams
*Attorney, Agent, or Firm*—Beveridge, DeGrandi, Weilacher & Young LLP

[57] ABSTRACT

A winding method to accomplish a stator coil of a motor by use of the blank slot technique. The number of stator slot of the motor is not an integer multiple of the number of poles, thus the number of stator slots, to which each individual pole corresponds, is a fraction. Either to install stator coils in stator slots such that the winding locations are the same as those of using fraction slot winding method, but in this case, some of the stator slots filled with long pole-pitch coils to perform double-layer winding will be left empty and will not be embedded with in the stator coil, or let the two neighboring sides slots of the stator, which requires to stride over a ling pole-pitch to perform double-layer winding, leave half of the slot empty an embed only half of the slot with stator coil, therefore it ends up with a simple winding mode and attains the object of eliminating cogging phenomena of a motor. Both of these winding can result in phase balance.

4 Claims, 4 Drawing Sheets

STATORS INCORPORATING BLANK WINDING SLOTS FOR A PERMANENT MAGNET BRUSHLESS MOTOR AND METHOD OF WINDING THEREOF

FIELD OF THE INVENTION

This invention pertains to a method and structure of a blank slot stator of a permanent magnet brushless motor. They are contained in the stator's iron core of the motor and are forming several stator slots so as to set up stator windings by using them. Also, the selection of the number of stator slot is a fraction slot, that is, the corresponding slot number of each individual pole is a fraction. But we should either leave the stator slots, which require to stride over a long pole-pitch to perform double-layer winding when we intend to install stator coils in stator slots, empty without embedding stator coils or let the two neighboring sides' stators of the stator, which requires to stride over a long pole-pitch to perform double-layer winding, leave half of the slot empty and embed only half of the slot with stator coil. In this way we can attain the object of eliminating cogging phenomena of a motor by means of a simple winding mode.

BACKGROUND OF THE INVENTION

For the permanent magnet brushless motor, there are two types of stator windings. One is the integer slot winding method, the other is the fraction slot winding method. For the so called integer slot winding method, the number of the stators is set to be the integer multiple of the number of the poles and the corresponding stator number of each pole is a positive integer. Its winding method is relatively simple, but the cogging phenomena of such kind of motor is rather serious so that the performance of the motor is poor. In order to resolve this kind of problem and eliminate the cogging phenomena, we present the mode of fraction slot winding. The selection of the number of the stator slots is such that the corresponding stator's number of each pole is a fraction. But by doing so, it will make the motor winding work become rather complex. Besides, we need to stride over a large pole-pitch to wind the coil. The end winding needs to enlarge also. This mode of winding is not suitable for winding work automation.

SUMMARY OF THE INVENTION

The purpose of this invention is to present a winding method of the stator structure of the motor by use of this winding method. Its winding mode is very simple and is similar to that of the motors with integer slot per pole per phase. It can also degrade the cogging phenomena of the motor, that is, it has both the advantages of the fraction slot winding and the integer slot winding methods and at the same time, resolves the unavoidable shortcomings of these two custom-used winding methods.

In order to attain the object as is stated above, this invention adopts the mode of setting up fraction slots and let the stators slots, which is performed the winding of double-layer coil by using the fraction slot winding method by means of blank slot technique, leave blank. In this way, this winding method is simplified and is similar to the integer slot winding method but completely eliminates the defects of the custom-used fraction slot winding method and is beneficial to the operation of winding automation. In the mean time, it resolves the cogging problem of the motors and effectively improve the winding factor of high-order harmonic waves of back E.M.F.

This invention presents also a kind of blank half-slot winding method which in the same way, adopts the mode of setting up fraction slots, but lets the two neighboring sides' slots of the stator, which is performed the winding of double-layer coil by using the custom-used fraction slot winding method, leave half of the slot blank and intall only half of slot with coils. In doing so, the stride distance of each bundle of wire is short, and the winding generation does not need very long stride distances.

Besides, the energy loss is less, cost is lowered and winding become easier. The winding factor of the third and the fifth harmonic wave is small by using this kind of winding method. It can lower the high-order harmonic wave in the condition that the air gap magnetic flux is not a well distributed sine wave.

To explain clearly the problems to be resolved, the technical means to be adopted and the efficiency to be attained by this invention, we cite a concrete and practical example to depict and make comparisons, also, to present detailed numerical values to convey its characteristics to facilitate the reviewing work.

DETAIL DESCRIPTION OF THE INVENTION

Figure 1:
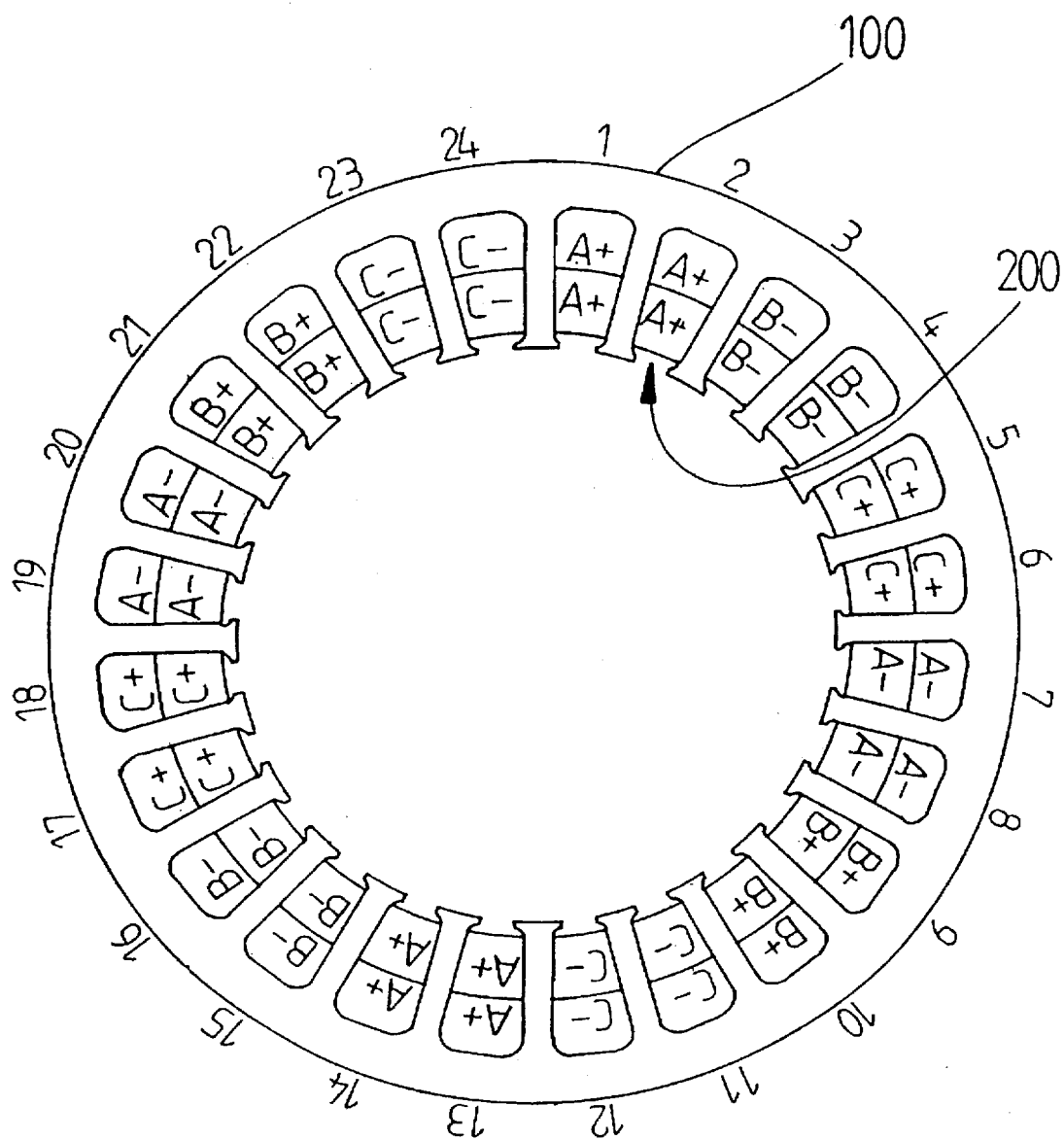
FIG. 1 is the wiring chart of a custom-used 4-pole, 24-slot integer slot winding method.

FIG. 1 shows the wiring mode of the custom-used 4-pole, 24-slot stator, that is, having install 24 stator slots 200 on the stator core 100 of the motor. The winding wires in the slots are represented by the phase numbers and pole attributes, for example, A+, B– etc. Note that what is illustrated is a kind of winding method of an integer slot. It contains three phases, A, B and C. The winding of each phase contains 8 stator slots including 4 outlets and 4 inlets slots respectively.

Each slot installs two bundles of wire with the same phase. The winding is rather simple.

As shown in the figure, the number along the outer layer represents the ordinal number, from the first slot through the 24th slot.

For example, there are two bundles of phase-A winding wire in the first slot and two bundles of phase-C winding wire in the 24th slot and so on. The connection mode is as follows.

|         | Inlet(+) | Outlet(–) |           |
|---------|----------|-----------|-----------|
| phase A | 1        | 20        |           |
|         | 2        | 7         |           |
|         | 13       | 8         |           |
|         | 14       | 19        | (neutral) |
| phase B | 9        | 4         |           |
|         | 10       | 15        |           |
|         | 21       | 16        |           |
|         | 22       | 3         | (neutral) |
| phase C | 17       | 12        |           |
|         | 18       | 23        |           |
|         | 5        | 24        |           |
|         | 6        | 11        | (neutral) |

Figure 2:
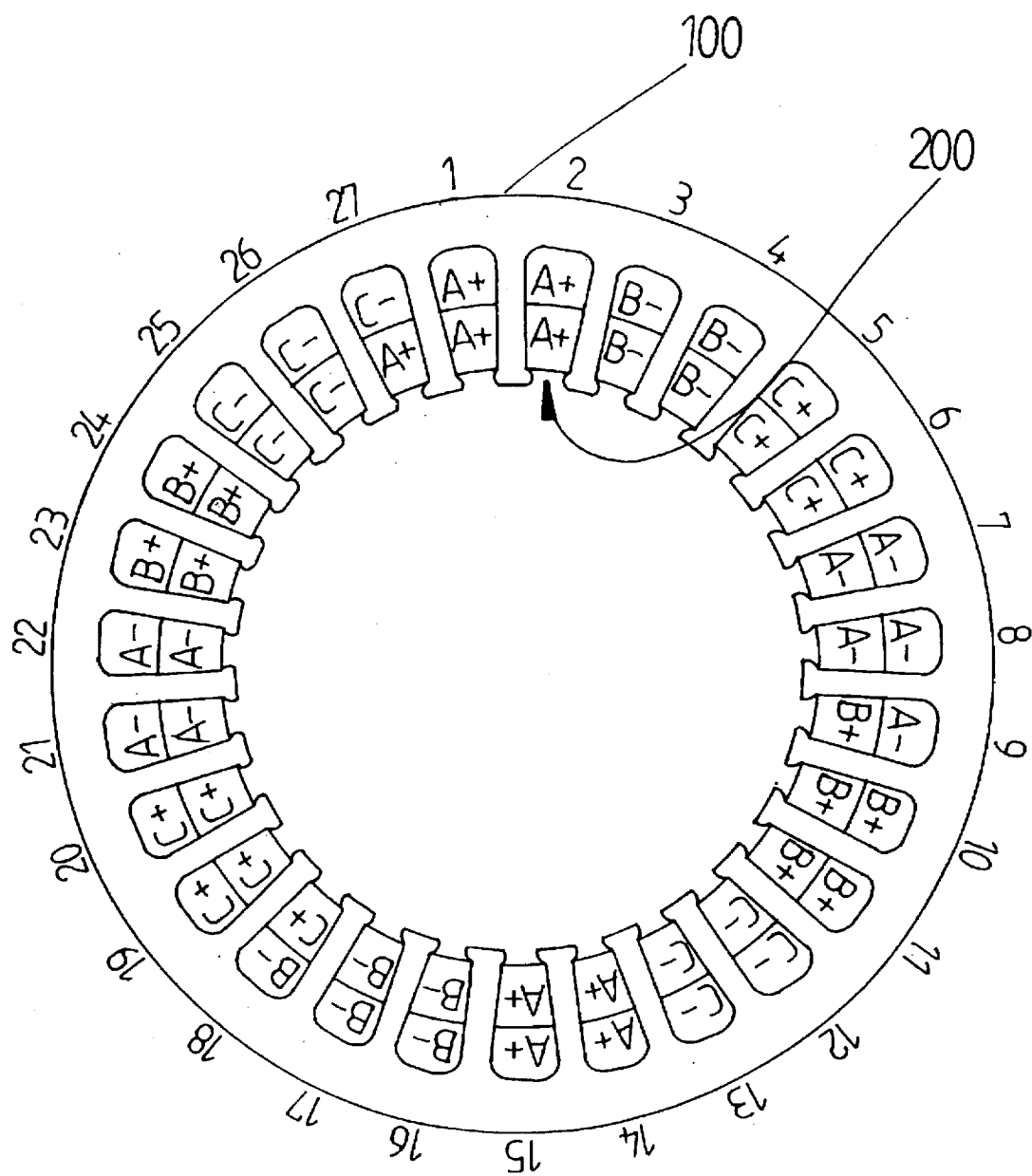
FIG. 2 is the wiring chart of a custom-used 4-pole, 27-slot fraction slot winding method.

As we can see from the wiring mode shown in FIG. 1 and the connection mode as is stated above, the winding method of the integer slot is relatively simple, only one set of coil in each slot, the winding operation is simple. But because of the magnetic action, it results in very significant cogging phenomena, and the winding factor of its fundamental wave becomes maximum. In order to eliminate the cogging phenomena, we present the fraction slot winding method. FIG. 2 shows the wiring chart of a 4-pole, 27-slot stator 100 which make the corresponding slot number of each pole, a fration. The connection mode is as follows:

| slot location | 3-phase | I/O wire |
|---|---|---|
| 1 | A+ | A+ |
| 2 | A+ | A+ |
| 3 | B- | B- |
| 4 | B- | B- |
| 5 | C+ | C+ |
| 6 | C+ | C+ |
| 7 | A- | A- |
| 8 | A- | A- |
| 9 | A- | B+ |
| 10 | B+ | B+ |
| 11 | B+ | B+ |
| 12 | C- | C- |
| 13 | C- | C- |
| 14 | A+ | A+ |
| 15 | A+ | A+ |
| 16 | B- | B- |
| 17 | B- | B- |
| 18 | B- | C+ |
| 19 | C+ | C+ |
| 20 | C+ | C+ |
| 21 | A- | A- |
| 22 | A- | A- |
| 23 | B+ | B+ |
| 24 | B+ | B+ |
| 25 | C- | C- |
| 26 | C- | C- |
| 27 | C- | A+ |

Note especially that the 9th, 18th and 27th slots are installed with double-layer winding of the fraction-slot motor, that is, each of the three slots contains a two-phase half-slot winding.

Due to the unsymmetrical characteristics between the rotor's magnetic pole and the stator's teeth, the cogging phenomena is greatly reduced.

But also because of this, the winding operation becomes very complicated.

We take a look again at the winding method of the 4-pole, 27-slot fraction slot motor, the connection-mode is as follows:

| | Inlet(+) | Outlet(−) | |
|---|---|---|---|
| phase A | 27 | 22 | |
| | 1 | 22 | |
| | 1 | 7 | |
| | 2 | 7 | |
| | 2 | 8 | |
| | 14 | 8 | |
| | 14 | 9 | |
| | 15 | 21 | |
| | 15 | 21 | (neutral) |
| phase B | 9 | 4 | |
| | 10 | 4 | |
| | 10 | 16 | |
| | 11 | 16 | |
| | 11 | 17 | |
| | 23 | 17 | |
| | 23 | 18 | |
| | 24 | 3 | |
| | 24 | 3 | (neutral) |

-continued

| | Inlet(+) | Outlet(−) | |
|---|---|---|---|
| phase C | 18 | 13 | |
| | 19 | 13 | |
| | 19 | 25 | |
| | 20 | 25 | |
| | 20 | 26 | |
| | 5 | 26 | |
| | 5 | 27 | |
| | 6 | 12 | |
| | 6 | 12 | (neutral) |

Comparing with the integer slot winding method, the fraction slot winding method needs to stride over a long winding distance as one third of a circumference, hence the end winding is relatively longer and the winding operation is rather difficult.

Figure 3:
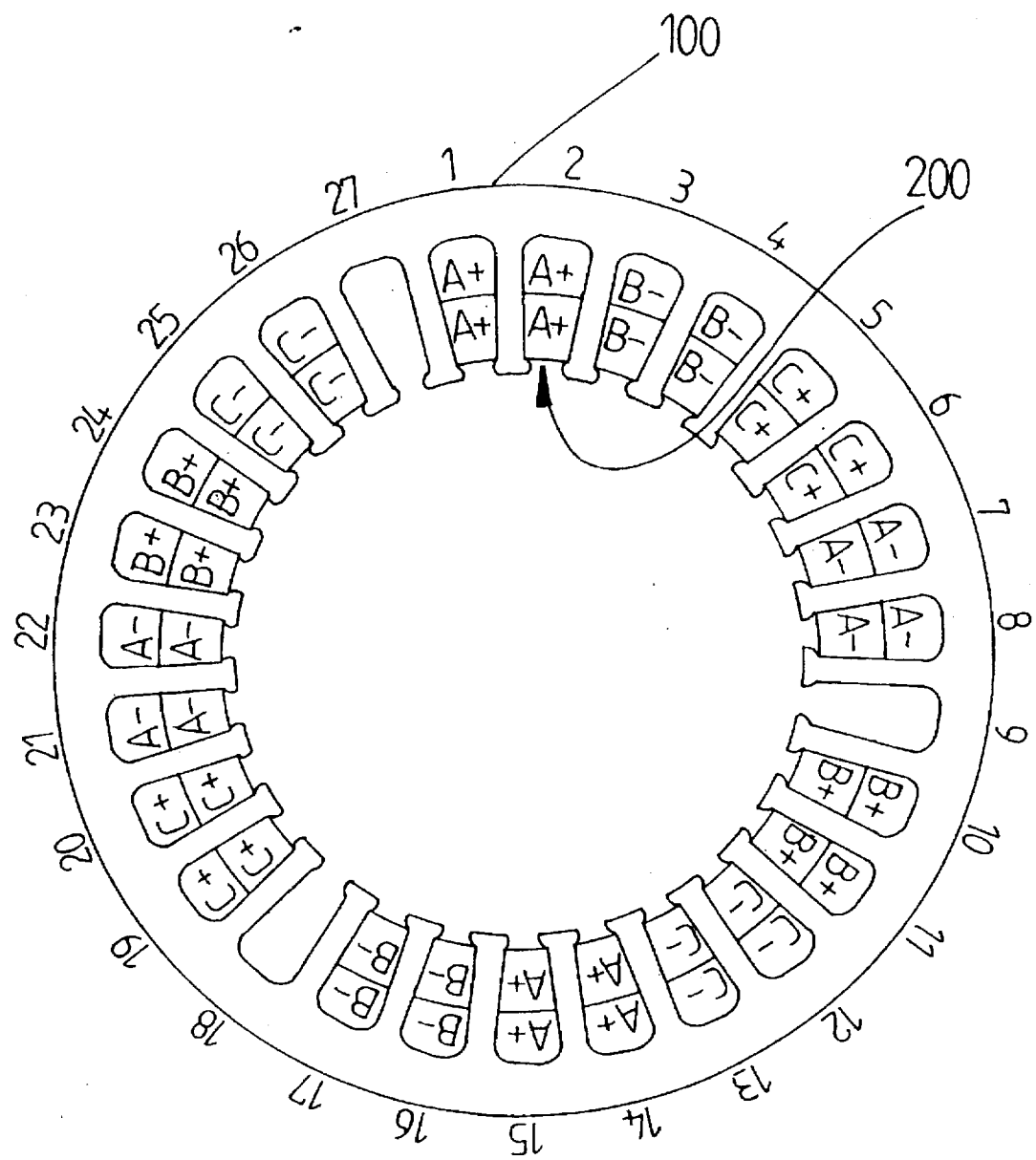
FIG. 3 is the wiring chart of a 4-pole, 27-slot of this invention, using the blank slot technique.
Figure 4:
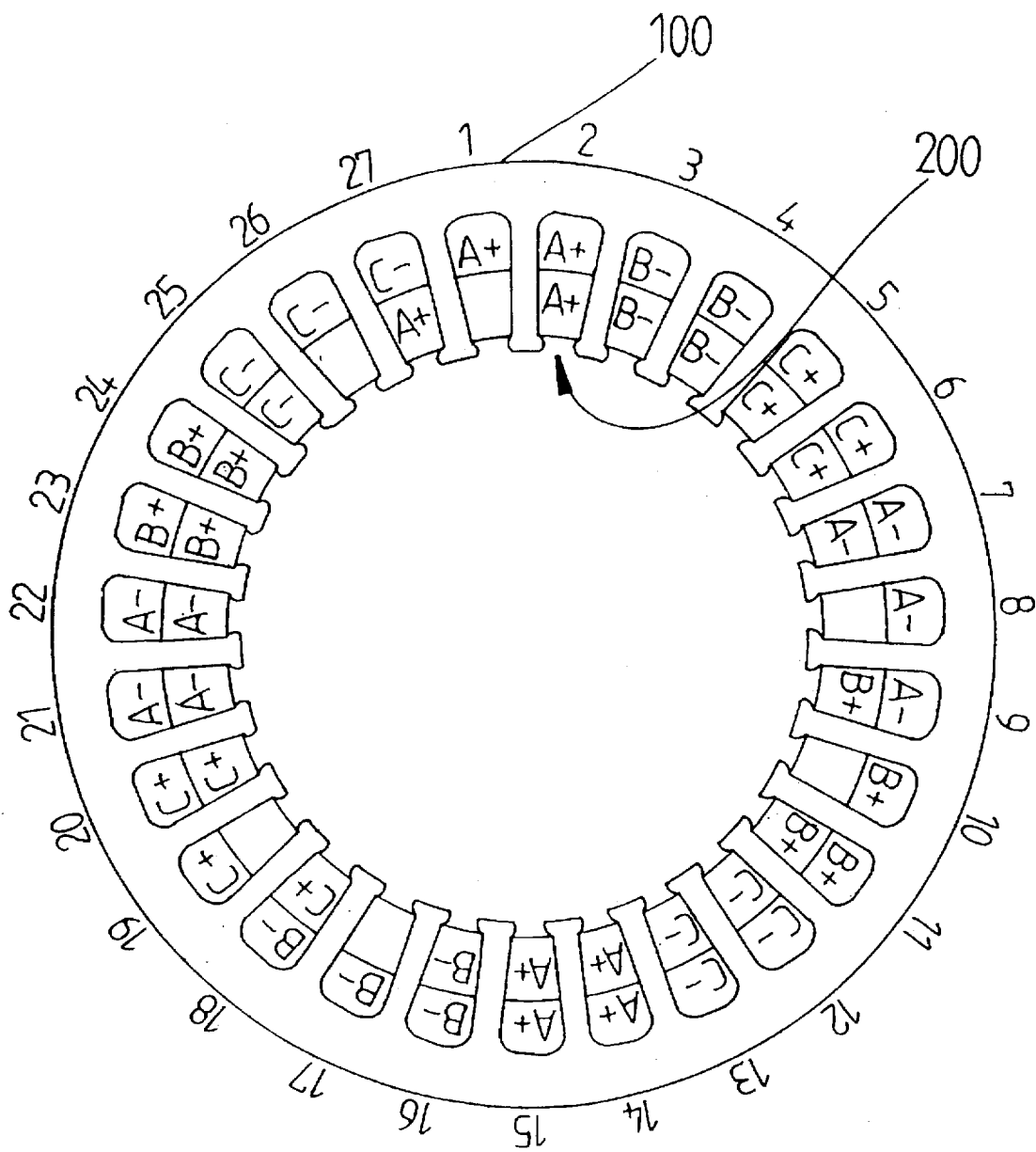
FIG. 4 is another 4-pole, 27-slot wiring chart, using the blank half slot technique.

This invention mainly adopts the fraction slot in conjunction with the technical means of the blank slot to attain the object of eliminating the cogging phenomena. FIG. 3 is the wiring chart of a practical example of a 4-pole, 27-slot winding. Note that, in this chart, the 9th, 18th and 27th, slots are blank slots, that is, to remove the coil of the long pole-pitch of a custom-used fraction slot winding method. Thus, what is installed in every slot is a coil with single phase. In doing so, we not only simplify the winding operation and turn it into the winding method similar to that of the integer slot's motor, but also reduce the length of end windings. Its connection mode is as follows:

| | Inlet(+) | Outlet(−) | |
|---|---|---|---|
| phase A | 2 | 7 | |
| | 14 | 8 | |
| | 15 | 21 | |
| | 1 | 22 | (neutral) |
| phase B | 11 | 16 | |
| | 23 | 17 | |
| | 24 | 3 | |
| | 10 | 4 | (neutral) |
| phase C | 20 | 25 | |
| | 5 | 26 | |
| | 6 | 12 | |
| | 19 | 13 | (neutral) |

Obviously, it is as simple as that of the integer slot winding method since it does not need to stride a large pole-pitch to do the winding and there is only one set of coil in each slot.

In this invention, we also cite a practical example in adopting the blank half-slot technique. It still keeps the mode of the fraction slot, i.e. the 4-pole, 27-slot structure.

It also maintains double layer winding method with two phases, but the neighboring slots have coils removed from the half-slot. The connection mode is as follows:

| | Inlet(+) | Outlet(−) | |
|---|---|---|---|
| phase A | 2 | 7 | |
| | 2 | 7 | |
| | 14 | 8 | |
| | 14 | 9 | |
| | 15 | 21 | |
| | 15 | 21 | |
| | 27 | 22 | |
| | 1 | 22 | (neutral) |

-continued

|         | Inlet(+) | Outlet(−) |           |
|---------|----------|-----------|-----------|
| phase B | 11       | 16        |           |
|         | 11       | 16        |           |
|         | 23       | 17        |           |
|         | 23       | 18        |           |
|         | 24       | 3         |           |
|         | 24       | 3         |           |
|         | 9        | 4         |           |
|         | 10       | 4         | (neutral) |
| phase C | 20       | 25        |           |
|         | 20       | 25        |           |
|         | 5        | 26        |           |
|         | 5        | 27        |           |
|         | 6        | 12        |           |
|         | 6        | 12        |           |
|         | 18       | 13        |           |
|         | 19       | 13        | (neutral) |

If we observe its connection mode closely, the stride distance of each bundle of wire is either four or five slots. It does not need to have a winding generation of extra large stride distance, thus the winding operation is easy to perform and since the end winding reduces, the winding resistance is lowered accordingly, and also, the energy loss is less and cost is reduced.

Here we compare the winding factors of the two practical examples of our invention with those of the two custom-used winding methods, we end up with the characteristics as shown in the following table.

| order of harmonic wave | | (1) 4-pole 27-slot single-layer winding (blank slot) | (2) 4-pole 27-slot double-layer winding (blank half-slot) | (3) 4-pole 27-slot double-layer winding (without blank slot) | (4) 4-pole 24-slot single-layer winding (integer slot) |
|---|---|---|---|---|---|
| 1  | winding | 0.9648 | 0.9483 | 0.9539 | 0.966 |
| 3  | factors | 0.7089 | 0.5858 | 0.6301 | 0.707 |
| 5  |         | 0.3170 | 0.0890 | 0.1856 | 0.259 |
| 7  |         | 0.0366 | 0.2597 | 0.1288 | 0.259 |
| 9  |         | 0.2165 | 0.3248 | 0.1925 | 0.707 |
| 11 |         | 0.1922 | 0.1842 | 0.0746 | 0.966 |
| 13 |         | 0.0420 | 0.0247 | 0.0589 | 0.966 |
| 15 |         | 0.1049 | 0.0245 | 0.0932 | 0.707 |
| 17 |         | 0.1494 | 0.0276 | 0.0365 | 0.259 |
| 19 |         | 0.0769 | 0.0875 | 0.0279 | 0.259 |
| 21 |         | 0.0455 | 0.0882 | 0.0404 | 0.707 |

As we can see from the numerical values shown in the table, the winding factors of the 1st, 3rd and 5th harmonic wave of the 4-pole, 27 slot blank slot winding method (1) do not make much difference compared with those characteristics of the 4-pole, 24-slot winding method (4), but its repress effect is much better for higher order harmonic waves.

Hence, by adopting the 4-pole, 27-slot blank slot winding method, the cogging torque is small, winding is simple and the repress effect is good for high-order harmonic waves. But since their winding factors of the 3rd and 5th harmonic waves are larger than those of the blank half-slot (4), we had better adopt the blank half-slot winding method when it comes to an air gap magnetic flux design and we are unable to effectively lower the generation of the high-order harmonic waves.

To summarize the above statement, this invention can attain the following.

1. The winding methods have been simplified and become the modes similar to those of the integer slot winding method.
2. Eliminate the cogging phenomina of the motor, and possess the low cogging torque characteristic.
3. Omit the coils of long pole-pitch which make the end winding shorter, cost lower and efficiency higher.
4. The winding factor for the high-order harmonic waves can be improved. It can also lower the high-order harmonic waves of the back electromotive force.

For the practical examples stated above, the parameters of the motor must satisfy the following equation $$Ns = m \cdot (p \cdot q \pm 1)$$

where Ns=number of slots in the stator of the motor, Ns>3 m=number of phase of the motor, m=3 p=number of poles of the motor, an even number, but not the multiple of 3 q=the number of slots per pole per phase, approximately equal to the phase zone slot number, a natural number In this equation, the number of blank slot of each phase is 1.

If q equals 1 and "−" (the minus sign) is used, then there will have empty phase zone generated.

It won't be adequate although it can still keep phase balance.

We can use the above formula but repeat k times as follows to make a motor with large poles.

$$Ns = k \cdot m \cdot (p' \cdot q \pm 1)$$

then the number of poles of the motor, p will be k·p', and the number of blank slots of each phase would be k.

From the summary as stated above, we can see that this invention "The winding methods and their structures of the stator's blank slot of a permanent magnet brushless motor" possesses high enterprising value. It is an original work of technical thoughts and has never been found in any publications.

It is in accordance with essential requirements of a patent in the relevant regulations of the "Patent Laws".

We claim:

1. A method for winding a stator of a brushless motor structure, comprising:

determining the number of slots Ns of said stator in accordance with $Ns = k \cdot m \cdot ((p' \cdot q) \pm 1)$; and winding said stator in an altered fraction slot winding pattern which has blank slots in slots where double-layer winding slots are positioned in a normal fraction slot winding pattern, wherein, q equals a number of slots per pole per phase, k equals a number of blank slots per phase and is greater than or equal to 1, m equals a number of phase of said motor, p equals a number of poles of said motor, p' is an even number multiplier, but not a multiple of 3, and said number of poles of the motor p is equal to said number of blank slots per phase k multiplied by said even number multiplier p' such that p=k·p'.

2. A method for winding a stator of a brushless motor structure as defined in claim 1, wherein:

Ns is equal to 27;

q is equal to 2;

k is equal to 1;

m is equal to 3; and p is equal to 4.

3. A method for winding a stator of a brushless motor structure, comprising:

determining the number of slots Ns of said stator in accordance with Ns=k·m·((p'·q)±1); and winding said stator in an altered fraction slot winding pattern which has half-blank slots adjacent to double-layer winding slots, wherein, q equals a number of slots per pole per phase, k equals a number of blank slots per phase and is greater than or equal to 1, two half-blank slots are equivalent to one blank slot, m equals a number of phase of said motor, p equals a number of poles of said motor, p' is an even number multiplier, but not a multiple of 3, and said number of poles of the motor p is equal to said number of blank slots per phase k multiplied by said even number multiplier p' such that p=k·p'.

4. A method for winding a stator of a brushless motor structure as defined in claim 3, wherein:

Ns is equal to 27;

q is equal to 2;

k is equal to 1;

m is equal to 3; and p is equal to 4.

* * * * *